United States Patent [19]
Nishida

[11] Patent Number: 5,406,576
[45] Date of Patent: Apr. 11, 1995

[54] HIGH POWER ION LASER TUBE HAVING DISCHARGE PORTION OF AMORPHOUS CARBON

[75] Inventor: Kazuhisa Nishida, Tokyo, Japan

[73] Assignee: NEC Corporation, Tokyo, Japan

[21] Appl. No.: 87,888

[22] Filed: Jul. 9, 1993

[30] Foreign Application Priority Data

Jul. 9, 1992 [JP] Japan .................................. 4-182012

[51] Int. Cl.⁶ .............................................. H01S 3/03
[52] U.S. Cl. .......................................... 372/61; 372/62
[58] Field of Search ........................ 372/55, 61, 62, 64, 372/65

[56] References Cited

U.S. PATENT DOCUMENTS

| | | | |
|---|---|---|---|
| 3,668,777 | 6/1972 | McMahan | 372/61 X |
| 3,670,256 | 6/1972 | McMahan | 372/64 |
| 3,670,257 | 6/1972 | McMahan | 372/64 X |

FOREIGN PATENT DOCUMENTS 58-39064  3/1983  Japan .

*Primary Examiner*—John D. Lee
*Attorney, Agent, or Firm*—Sughrue, Mion, Zinn, Macpeak & Seas

[57] ABSTRACT

A discharge portion of an ion laser tube is formed of either amorphous carbon or crystalline graphite member having an amorphous carbon layer on its surface.

8 Claims, 1 Drawing Sheet

HIGH POWER ION LASER TUBE HAVING DISCHARGE PORTION OF AMORPHOUS CARBON

BACKGROUND OF THE INVENTION

The present invention relates to anion laser tube and, particularly, to discharge portion of a high power ion laser tube.

In an ion laser tube which generates laser oscillation by utilizing transition between energy levels of ionized gas such as argon or krypton, etc., it is required generally that ion density is increased with increase of output power thereof. In order to achieve this requirement, it is general to flow large current exceeding 20 amperes through a discharge portion. Therefore, the discharge portion has to be made of material having high heat conductivity, so that heat generated in the discharge portion can be efficiently radiated, and durability against plasma of high ion density. An example of such material which has been used widely is crystalline graphite in view of its heat durability and easiness of treatment.

Since, however, graphite product is usually porous, it is easily sputtered by high ion density plasma, resulting in dust as well as gas emission.

In order to measure these defects, it has been proposed to coat the discharge portion of graphite with molybdenum by using thermal spray technology. An example of this technique is disclosed in Japanese Utility Model Application Laid open No. Sho 58-39064.

However, for many reasons, such as that thermal expansion coefficient of graphite is different from that of molybdenum and adhesion of a molybdenum layer prepared by thermal spray to the graphite base member is relatively low, such molybdenum coating is easily peeled off when the discharge portion is subjected to high temperature due to discharge of a working laser tube and sputtering, etc., and the molybdenum layer peeled off may clog an optical path of the laser tube. Further, a large amount of gas may be emitted from a portion of the graphite member exposed from the molybdenum layer. Such gas discharge may shorten the life of the ion laser tube and may cause an initial operational failure thereof. Further, dust of the molybdenum layer peeled off from the graphite member may deposit on opposite optical windows of the ion laser tube during transportation thereof, which may cause a long distance transportation of the ion laser tube to be impossible.

SUMMARY OF THE INVENTION

An object of the present invention is to provide a long life ion laser tube.

According to the present invention, an ion laser tube has a discharge portion formed of either amorphous carbon or graphite material coated with amorphous carbon.

It is preferable that amorphous carbon comprises either glassy carbon or Diamond Like Carbon.

DESCRIPTION OF THE PREFERRED EMBODIMENTS

Figure 1:
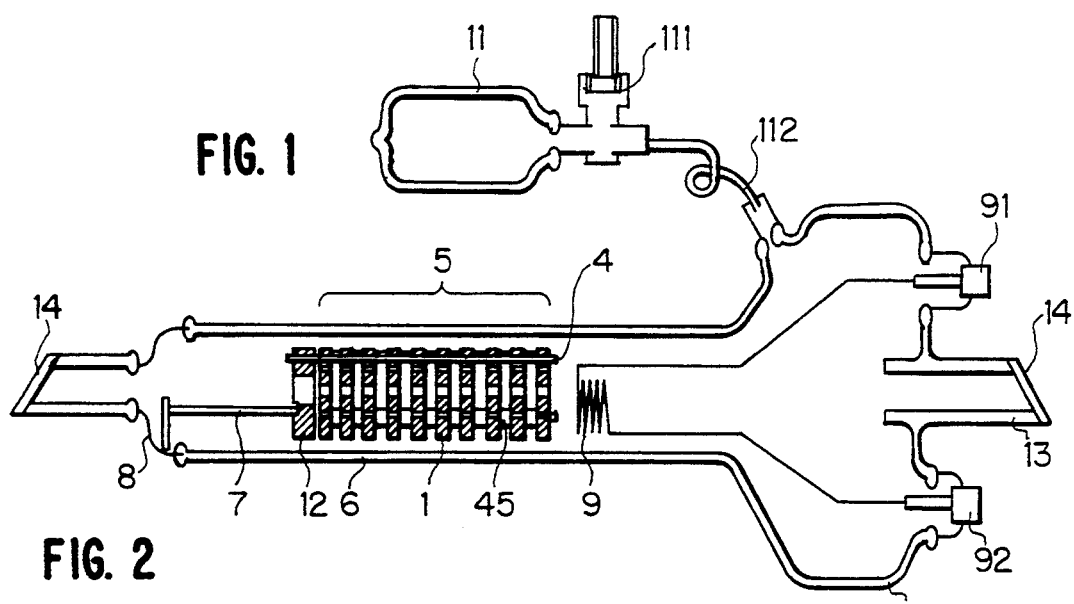
FIG. 1 is a cross section of an ion laser tube according to the present invention.
Figure 2:
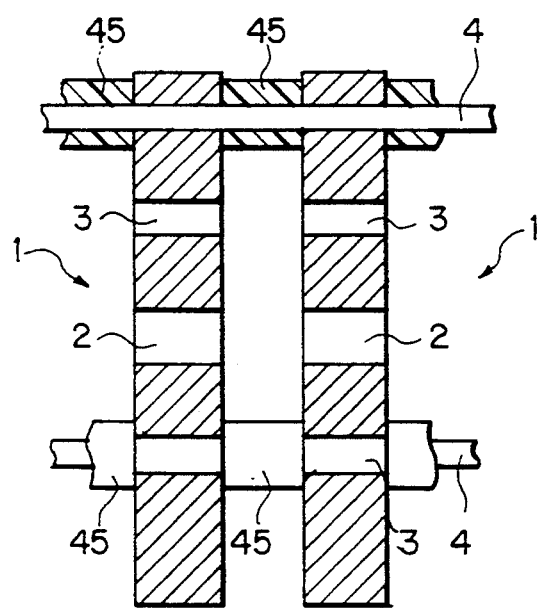
FIG. 2 is an enlarged cross section of one of the disk members constituting the discharge portion according to a first embodiment of the present invention.
Figure 3:
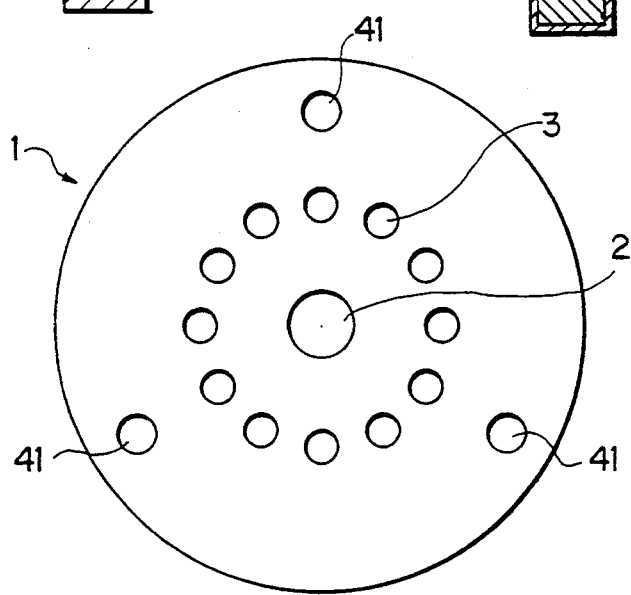
FIG. 3 is a plan view of the disk member shown in FIG. 2.

According to the first embodiment of the present invention, a major part of the discharge portion is made up of a plurality of axially spaced disk members 1 as shown in FIGS. 1 to 3. Each of the disk member is make of amorphous carbon. The amorphous carbon disk 1 is a circular disk having diameter of 30 mm and thickness of 5 mm. The disk 1 is provided with a center hole 2 and a plurality of gas return holes 3. The center hole 2 has a diameter of 2.5 mm to define a discharge path. Each of the gas return holes 3 has a diameter of 1.5 mm. About 30 to 40 of the disk members 1 are prepared and stacked so as to be arranged along a laser axis of the ion laser tube by using supporting rods 4 and spacer members 45. The supporting rods 4 and the spacer members 45 are made of electrical insulative material such as alumina such that the adjacent disk members 1 are electrically separated from each other. In a peripheral portion of each disk 1, three holes 41 (FIG. 3) are provided to pass through the supporting rods 4, respectively, each having a diameter of 1.0 mm. Each of the spacer members 45 has an outer diameter of 3.0 mm and a length of 5 mm. An anode 12 is fixedly secured to one end of the discharge portion 5 and then inserted into a quartz glass tube 6 and fixedly supported by a metal support rod 7. The metal support rod 7 is fixed on a metal sealing dish 8 which is connected to one of the openings of the quartz glass tube 6. Therefore, power supply to the anode electrode 12 is performed through the metal sealing disk 8 and the metal support rod 7. The other opening portion of the quartz glass tube 6 is closed by one end of a glass bulb 10 having a cathode electrode 9 in the form of a coil provided therein. A gas reservoir 11 for supplementing a portion of argon gas which is consumed by electric discharge is connected to a side face of the glass bulb 10 through a valve 111 and a pipe 112. Terminals 91 and 92 to be connected to the cathode electrode 9 are provided on the other end of the glass bulb 10. Opposite ends of an enclosure thus constructed are sealed by tube members 13 each having a Brewster window 14, resulting in an ion laser tube of the present invention.

Though, in this embodiment, each disk 1 is formed of amorphous carbon, the disk may be formed according to the second embodiment which will be described with reference to FIG. 4.

Figure 4:
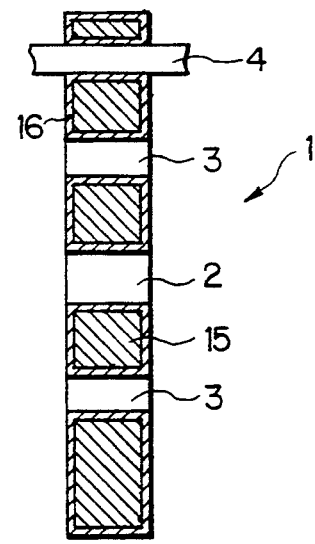
FIG. 4 is an enlerged cross section of one of the disk members constituting the discharge portion according to a second embodiment of the present invention.

According to the second embodiment of the present invention, a disk 15 having the same size as that of the disk 1 shown in FIG. 2 is formed of crystalline graphite and an entire surface thereof is coated with an amorphous carbon layer 16 as shown in FIG. 4. The amorphous carbon layer 16 is formed by painting the entire surface of the graphite disk 15 with carbon powder paste dissolved in an organic solvent of aliphatic chlorine and then sintering it at 1200° C. The thickness of the amorphous carbon layer thus obtained on the surface of the graphite disk 15 is in the order of 1 to 2 $\mu$m and amorphous carbon is diffused into the graphite disk by a depth in the order of 0.5 to 1.5 mm. The amorphous carbon layer obtained in this manner is referred to as "glassy carbon" whose dust and gas emission due to sputtering are smaller than those from crystalline graphite by three figures and one figure, respectively. Further, adhesion of the amorphous carbon layer to the graphite surface is excellent due to the diffusion of amorphous carbon into the graphite member. Further, since thermal expansion coefficient is common for amorphous carbon and graphite, there is no peeling off of the amorphous carbon layer even if the discharge portion is heated to very high temperature. The glassy carbon has properties of density of 1.4 to 1.6 g/cc, Shore hardness of 80 to 100, heat conductivity of 6.26 W/m·K and bending stress of 2000 to 3000 kg/cm$^2$.

Though, in the second embodiment, the amorphous carbon layer is formed by painting the graphite surface with liquid phase amorphous carbon and sintering it, the amorphous carbon layer can be formed by chemical vapor deposition (CVD). In the latter case, the so-called DLC (Diamond Like Carbon) layer is obtained. Particularly, when a low pressure CVD is used, a resultant DLC layer on the graphite surface is 1 μm thick and diffusion depth is 1.0 mm. As the glassy carbon, the DLC has advantages that discharge of dust and gas is small compared with crystalline graphite. The DLC has properties of density of 2.0 g/cc, Shore hardness of 5000 and heat conductivity of 20.9 W/m·K. Thus, DLC is excellent compared with glassy carbon since its hardness and heat conductivity are much higher than those of the glassy carbon. Further, since degradation due to electric discharge is also smaller than glassy carbon, it is suitable for the material of the discharge portion of an ion laser tube.

As described hereinbefore, according to the present invention, the discharge disk member is formed of amorphous carbon or crystalline graphite coated with amorphous carbon, so that sputtering durability of the discharge portion is improved while minimizing dust and gas discharge due to electric discharge, resulting in a long life, high power and stable ion laser tube. According to the ion laser tube, the life time at output level of 4 W is elongated by substantially twice the life time of the conventional ion laser tube of 2000 hours. Further, reduction rate of output power after 300 hours is 5% or less which is much improved compared with that of the conventional ion laser tube of about 60%. In addition, due to considerable reduction of dust generation from the discharge portion, a long distance transportation of the ion laser tube can be done without any trouble. Thus, according to the present invention, a reliable, high power ion laser tube is realized.

What is claimed is:

1. An ion laser tube comprising: an air tightly sealed enclosure containing discharge gas; a plurality of disk members disposed within said enclosure and arranged along a laser axis of the ion laser tube to provide a discharge portion, each of said disk members having a center hole to define a discharge path and at least an outer surface of each said disk member being formed of amorphous carbon; and an anode electrode and a cathode electrode positioned at opposite ends of said discharge portion, respectively.

2. The ion laser tube claimed in claim 1, wherein each of said disk members is formed of graphite coated with an amorphous carbon layer.

3. The ion laser tube claimed in claim 2, wherein the thickness of said amorphous carbon layer is 1 to 2 μm.

4. The ion laser tube claimed in claim 2, wherein amorphous carbon is diffused to a surface of said graphite member by a depth of 0.5 to 1.5 mm.

5. The ion laser tube claimed in claim 1, wherein each of said disk members is made of amorphous carbon.

6. The ion laser tube claimed in claim 1, wherein said amorphous carbon is glassy carbon.

7. The ion laser tube claimed in claim 1, wherein said amorphous carbon is diamond like carbon.

8. An ion laser tube comprising: an air tightly sealed enclosure containing discharge gas; an anode electrode and a cathode electrode arranged in said enclosure; and a discharge portion disposed between said anode electrode and said cathode electrode, said discharge portion being constituted with a plurality of disk members stacked, each of said disk members being provided with a center hole and a plurality of gas-return holes arranged around said center hole, at least an outer surface of each of said disk members being formed of amorphous carbon.

* * * * *